Feb. 19, 1963    J. VADUS ETAL    3,078,459
V BEAM HEIGHT INDICATING SYSTEM
Filed Nov. 18, 1955    2 Sheets-Sheet 1

INVENTORS
JOSEPH VADUS
CHARLES M. CLOTHIER
BY
ATTORNEY

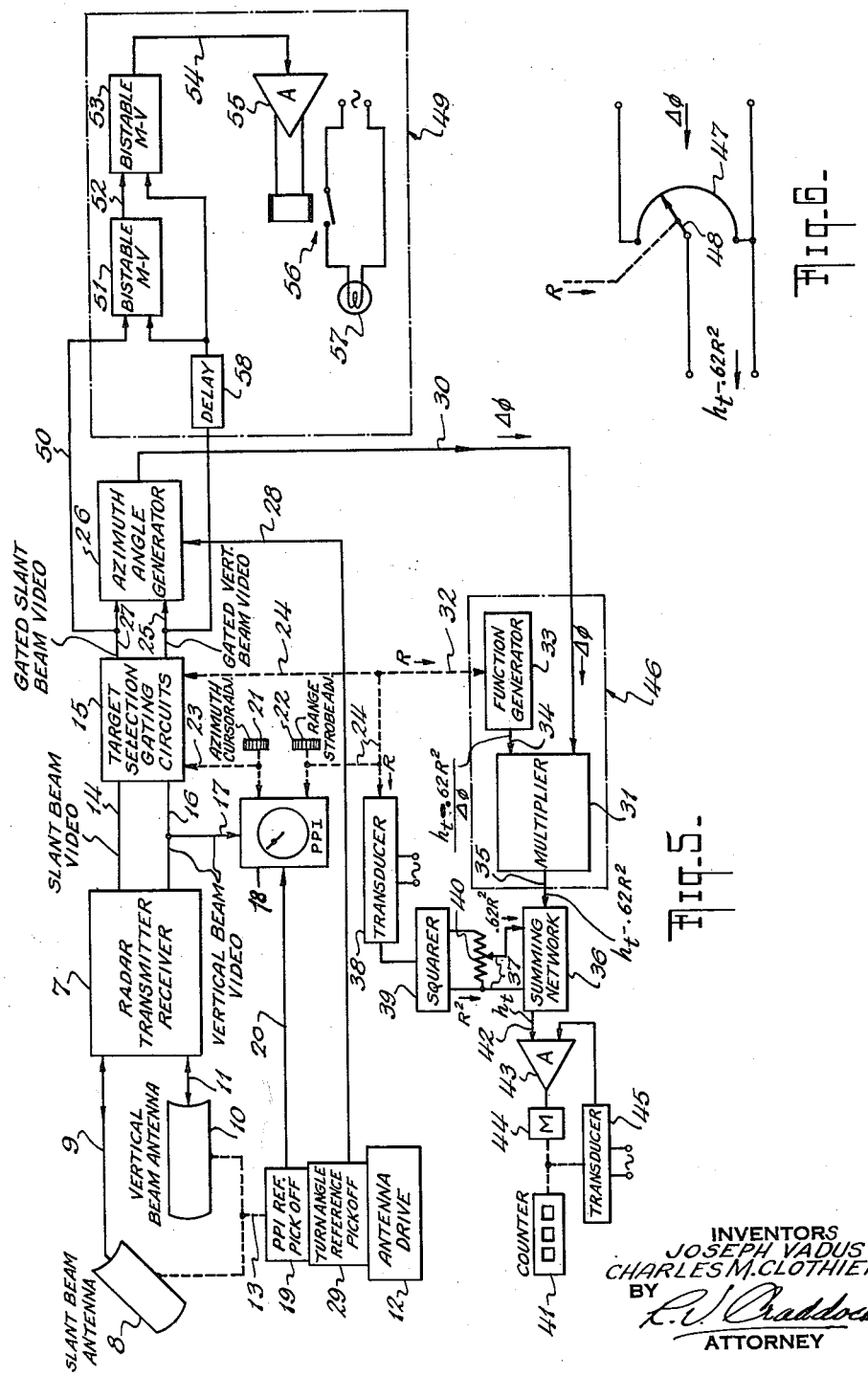

United States Patent Office 3,078,459
Patented Feb. 19, 1963

3,078,459
V BEAM HEIGHT INDICATING SYSTEM
Joseph Vadus, Carle Place, and Charles M. Clothier, Farmingdale, N.Y., assignors to Sperry Rand Corporation, a corporation of Delaware
Filed Nov. 18, 1955, Ser. No. 547,828
9 Claims. (Cl. 343—11)

This invention relates to radio object-locating systems. More particularly, the invention concerns a novel and improved arrangement adapted for use in conjunction with a V-beam radar system for providing a direct indication of the true height of aircraft or the like detected by the system.

The jointly-rotatable angularly-disposed antennas of a V-beam radar system of the type presently contemplated radiate a vertical beam and a slant beam, both of which are of planar or sheet-like configuration and which form in combination a V-trough having its base generally parallel to the surface of the earth, that is, tangent to the earth's sphere at the situs of the antenna apparatus.

The antennas are rotated, with the vertical beam preferably in the lead, so that an above-ground target, such as an aircraft within the system's detection range, is first illuminated by the vertical beam, then by the slant beam.

The angular distance through which the antenna apparatus is rotated for the vertical and slant beams thereof to successively detect the target is generally termed the azimuth angle. In conventional V-beam height determining arrangements, such as described, for example in Vol. 1 of Radiation Laboratory Series, pp. 192–196, McGraw-Hill, 1947, azimuth angle information is presented on the face of a suitably-calibrated indicator scope against slant range information, the latter preferably being obtained from the vertical beam. Hence, the indication is akin to a B-scope presentation in that angle versus range is presented.

It is known by simple trigonometric analysis that the vertical height $h_v$ of the target above the base of the V-trough may be expressed as follows:

$$h_v = \frac{R \sin \Delta\phi}{(\tan^2 \alpha + \sin^2 \Delta\phi)^{1/2}} \quad (1)$$

where R is slant range, $\Delta\phi$ is azimuth angle, and $\alpha$ is the fixed dihedral angle between the vertical and slant beams.

On the basis of the azimuth angle $\Delta\phi$ and slant range R data displayed on the scope, and in view of the foregoing Relation 1 for $h_v$ wherein $\Delta\phi$ and R are the only variables, prior art height determining arrangements have generally employed a transparent overlay having a number of $\Delta\phi$ vs. R plots thereon for different assumed values of $h_v$, which overlay is placed on the face of the scope so that the value of $h_v$ for the particular display may be estimated from the display's positional relation to the $\Delta\phi$ vs. R plots.

Where a fixed azimuth separation of the two beams, generally about 10°, is employed to overcome the danger of too close a display of vertical and slant beam echoes from a low-flying target, the fixed separation angle is accounted for in the height determination by moving the overlay with respect to the scope so that the overlay's zero $\Delta\phi$ coordinate point is displaced from the scope's zero $\Delta\phi$ coordinate point by an amount equal to the separation angle.

Due to the curvature of the earth and atmospheric refraction, the true height $h_t$ of the target is $h_v$ plus a correction factor $h_c$. Insofar as curvature is concerned, $h_c$ is trigonometrically derived to have a value, for all practical purposes, equal to $$\frac{R^2}{2r}$$

where $r$ is the average radius of the earth. To account for refraction also, it has been the usual practice in the past to use a value for $r$ equal to $\frac{4}{3}$ earth's radius, so that the correction factor for both curvature and refraction has been assumed to be $$h_c = \frac{R^2}{2 \times \frac{4}{3} r} = .663 R^2 \quad (2)$$

Thus, since $$h_t = h_v + h_c \quad (3)$$

true height has been determined by adding $.663R^2$ to the value of $h_v$ obtained from the scope.

It has recently been determined, however, that a value of $\frac{4}{3}$ earth's radius for $r$ in the expression $$h_c = \frac{R^2}{2r}$$

may not be validly assumed. That is to say, it is now known that $$\frac{h_c}{R^2}$$

varies considerably with $h_v$ in a particular non-linear manner. Hence, the solution of $h_t$ is actually more complex than hitherto assumed.

The present invention is directed toward providing a true or corrected height determination wherein the actual variation of $$\frac{h_c}{R^2}$$

with $h_v$ is accounted for. In other words, not only is the proportionality of $h_c$ to $R^2$ recognized in the present height solution, but also its proportionality to a variable having a known variation with respect to $h_v$. Moreover, the invention is directed toward the elimination of a scope display of $\Delta\phi$ vs. R information for height determination, and the substitution of a functional computer arrangement responsive to $\Delta\phi$ and R input data for providing an output voltage proportional to $h_t$ which voltage may be readily transformed by servomechanism means, including a mechanical counter device, into a direct numerical reading.

Thus, the principal object of the invention is the provision of an arrangement for accurately computing, with the aid of a V-beam radar system, the properly corrected height of a target without the necessity of estimating height from a scope display of azimuth angle and slant range information, nor the necessity of mentally determining and applying the height correction decreed by earth's curvature and atmospheric refraction.

Another object is to provide an alarm apparatus for drawing the operator's attention to a condition where false azimuth angle data is produced due to the trailing beam detecting a second target before it reaches the target first detected by the leading beam.

With the foregoing and other objects in view, the present invention includes the novel elements and the combinations and arrangements thereof described below and illustrated in the accompanying drawings, in which FIGS. 1 to 4, inclusive, are graphical plots that successively depict the evolution of the relation upon which the true height computation of the present invention is based;

FIG. 5 is a block diagram of the system of the present invention; and

FIG. 6 is a schematic diagram of a functional multiplier suitable for use in the system of FIG. 5.

Figure 1:
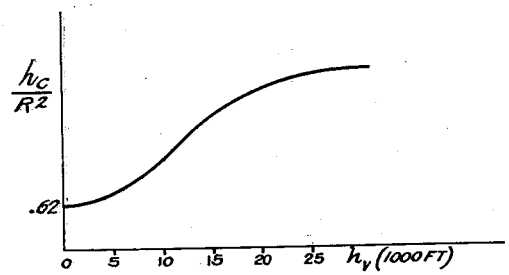
FIG. 1 is a plot of $$\frac{h_c}{R^2} \text{ vs. } h_v$$
Figure 2:
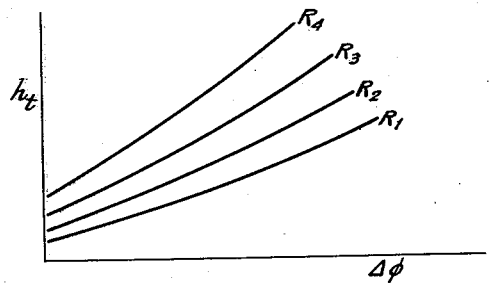

that has resulted from an extensive empirical survey of the role that atmospheric refraction plays in affecting the determination of target height by a V-beam radar. From the Expression 1 for $h_v$ and the Expression 3 for $h_t$, together with the plot of FIG. 1, a family of $h_t$ vs. $\Delta\phi$ curves may be plotted as depicted in FIG. 2 for different assumed values of R. It will be noted that each of the curves of FIG. 2 is substantially linear. The realization of this fact has made possible the computation upon which the present invention is based.

Figure 3:
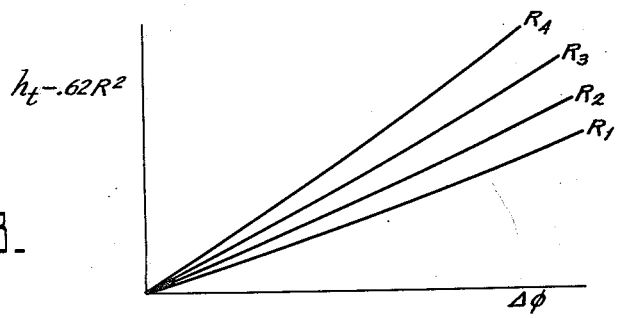
Figure 4:
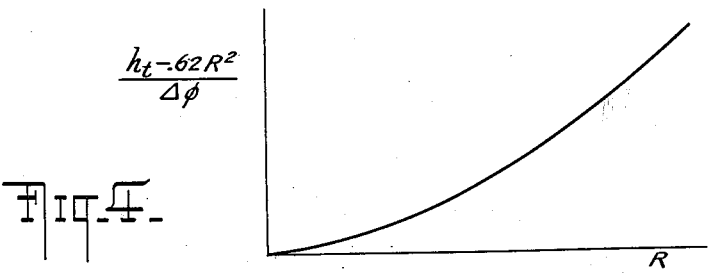

The substantially linear curves of FIG. 2 intesect the zero $\Delta\phi$ ordinate at different values of $h_t$ other than zero. It is evident, however, that each curve will intersect at zero $\Delta\phi$ if $.62R^2$ is subtracted from $h_t$, since from FIG. 1 it is seen that $h_c = .62R^2$ when $h_v = 0$ and from Equation 1 $h_v = 0$ when $\Delta\phi = 0$, so that from Equation 3 it is apparent that $(h_t - .62R^2) = 0$. Accordingly, FIG. 3 shows the curves of FIG. 2 replotted as $(h_t - .62R^2)$ vs. $\Delta\phi$, each curve retaining its substantial linearity but now intersecting at a common zero coordinate point. The average slope of each curve of FIG. 3 is then readily plotted against its value of range to form the single curve $$\frac{h_t - .62R}{\Delta\phi} \text{ vs. } R$$

of FIG. 4.

Having the relation of quantities graphically illustrated in FIG. 4, the present invention, as now will be described in connection with FIG. 5, employs a function generating means responsive to an input signal proportional to R, derived from a V-beam radar, for generating a voltage that varies with R as $$\frac{h_t - .62R^2}{\Delta\phi}$$

varies therewith. This voltage is then multiplied by a second input signal derived from the radar and proportional to $\Delta\phi$ to produce a voltage proportional to $(h_t - .62R^2)$. Squaring means, responsive to the R input signal, provides a voltage proportional to $.62R^2$ which is added to the $(h_t - .62R^2)$ voltage so as to produce a resultant voltage proportional to $h_t$, the quantity sought.

In FIG. 5, the transmitter and receiver portions of the V-beam radar are combined, for purposes of simplification, in a transmitter-receiver apparatus 7. Slant beam transmission and echo pulses are fed to and received the slant beam antenna 8 via a transmission line 9 coupling antenna 8 to apparatus 7. Vertical beam transmission and echo pulses are fed to and received from the vertical beam antenna 10 via a transmission line 11 coupling antenna 10 to apparatus 7. Antennas 8, 10 are jointly rotatable in their fixed mutual relation, with antenna 10 preferably in the lead, by an antenna drive device 12 mechanically connected to the antennas by a linkage 13.

Slant beam video is fed via a transmission line 14 from the receiver portion of apparatus 7 to a gating means 15 provided for target selection purposes, while vertical beam video from apparatus 7 is fed to means 15 via a transmission line 16. The vertical beam video from apparatus 7 is also fed via a transmission line 17 to a PPI apparatus 18 so that a particular target whose height is to be determined may be identified in terms of its azimuth and range. A pick-off device 19, driven by antenna drive 12, provides a signal via a lead 20 to PPI apparatus 18, which signal is employed in the PPI deflection circuits to produce the usual rotary sweep in synchronism with the rotation of antennas 8, 10. Apparatus 18 is further provided with adjustment knobs 21, 22 which are respectively adapted to rotate an azimuth cursor and to move a range strobe or intensified spot along the cursor trace on the indicator so that these electronics markers may be placed by the operator on the display of a chosen target.

Gating means 15 is responsive to mechanical azimuth and range signals fed thereto, respectively, by way of linkages 23, 24 from azimuth and range adjustment knobs 21, 22 so that slant and vertical beam video signals are only permitted to pass through the gating means when such signals are returned from given respective volumetric segments in space surrounding the chosen target. The vertical beam video thus gated for a target of specified range and azimuth is fed via a lead 25 to an azimuth angle generator 26 which also receives the gated slant beam video from gating means 15 via a lead 27.

Azimuth angle generator 26 receives antenna rotation signal data via a lead 28 from a pick-off 29 driven by antenna drive 12, and provides a signal voltage output that is proportional to the angular distance through which antennas 10, 8 rotate from the time that gated vertical video is received by generator 26 to the time that gated slant video is received. In order that this angular distance be determined as accurately as possible, generator 26 preferably includes a beam-splitting circuit for each channel, a number of such circuits being well-known, for ascertaining exactly when the centers of the respective beams are swept across the target.

The signal voltage output of azimuth angle generator 26 is the $\Delta\phi$ signal that is required in the true height computation performed by the present invention. The R signal, also required, is available in mechanical form from the range strobe adjustment knob 22. The next operation, then, is to employ these signals, together with the curve of FIG. 4, to determine true height. Accordingly, the $\Delta\phi$ signal is fed via a lead 30 from azimuth angle generator 26 to a multiplier 31, while the R signal is fed via a mechanical connection 32 to a function generator 33.

Function generator 33 responds to its mechanical R signal input to produce a signal voltage on the generator output lead 34 that varies with R as the quantity $$\frac{h_t - .62R^2}{\phi\Delta}$$

varies with R in FIG. 4. Lead 34 is connected to multiplier 31 so that the $$\frac{h_t - .62R^2}{\Delta\phi}$$

signal is multiplied by the $\Delta\phi$ signal voltage on lead 30 to produce a multiplier output signal voltage proportional to $(h_t - .62R^2)$. The multiplier output is then fed via a lead 35 to a summing network 36 which also receives an input signal voltage proportional to $.62R^2$ via a pair of leads 37. The $.62R^2$ signal on leads 37 is obtained from a signal generator or transducer 38 mechanically connected to the range strobe adjustment knob 22 in driven relation so as to provide a signal voltage proportional to R which is then squared by a squarer element 39 to provide a voltage proportional to $R^2$. Lead 37 couple the squarer element 39 to summing network 36 by way of a voltage divider 40 which is arranged so that the voltage supplied to network 36 via leads 37 is proportional to $.62R^2$. The summing network adds the two inputs thereto to provide an output voltage proportional to $h_t$.

If, for improved performance with low-flying targets, the slant beam and vertical beam are given a fixed azimuth separation so that there is this separation between the respective return signals even from a target at zero altitude, it will be clear that the $\Delta\phi$ output of the azimuth angle generator 26 may be readily adjusted in a variety of well-known ways to remove the fixed separation angle component from $\Delta\phi$ before the latter reaches multiplier 31.

In order to provide a direct numerical reading of $h_t$ or true height, a mechanical counter device 41 may be driven in accordance with the $h_t$ voltage output of summing network 36. To this end, the $h_t$ voltage is fed via a lead 42 to an amplifier 43 which supplies a servomotor 44 drivably connected to the counter 41. A feedback or wipe-out signal for the amplifier is generated by a transducer 45, also driven by the motor, to insure that the counter is driven an amount in proportion to $h_t$.

Function generator 33 and multiplier 31 in combination may be regarded as a functional multiplier 46. In fact, both devices may be incorporated into a single device such as depicted, for example, in FIG. 6. The arrangement of FIG. 6 comprises a potentiometer winding 47 over which a sliding contact 48 may be mechanically driven. If winding 47 is wound with the function $$\frac{h_t - .62R^2}{\Delta\phi}$$

from FIG. 4, and if the winding is energized by a voltage proportional to $\Delta\phi$, then when contact 48 is driven in accordance with R, a voltage between the contact and one end of the winding may be obtained which is proportional to $h_t - .62R^2$. Thus, the simple potentiometer arrangement of FIG. 6 may be employed as the functional multiplier 46 of FIG. 5.

In the system illustrated in FIG. 5, a means 49 is included for providing an alarm indication in the event that the slant beam (trailing beam) detects a second target in its gated coverage before it is swept past the target first detected by the vertical beam (leading beam). If this event should occur, a false height determination would result, the determination being neither correct for the first target nor correct for the second target. Hence, the desirability of such an alarm is evident.

To provide the aforesaid alarm, gated slant beam video is fed via a lead 50 (FIG. 5) to a first bistable multivibrator 51 which is normally in its On condition. The output on multivibrator 51 is fed via a lead 52 to a second bistable multivibrator 53, also normally On. Finally, the output of multivibrator 53 is fed via a lead 54 to an amplifier 55 which is arranged to conduct and thereby energize a relay 56 to close an alarm circuit including a lamp 57 only when multivibrator 53 is switched to its Off condition.

The first slant beam video to appear on lead 50 for a given scan places multivibrator 51 in its Off condition. Multivibrator 53 remains On, since it is adapted to be affected, insofar as its response to slant beam video is concerned, only when multivibrator 51 goes from Off to On.

If a second slant beam return is received, it causes multivibrator 51 to go from Off to On, thereby causing multivibrator 53 to go Off to actuate the alarm. If a third target is intercepted by the slant beam, the video therefrom turns multivibrator 51 Off again, and multivibrator 53 is unaffected, that is, remains Off so as to maintain the alarm. A fourth echo will switch multivibrator 51 On, tending to switch multivibrator 53 Off, but the latter is already Off and the alarm, therefore, continues to remain actuated.

In order to restore or reset the alarm means 49 to its normal condition so as to monitor the next scan of the antennas, gated vertical beam video is fed from lead 25 via a delay device 58 to multivibrators 51, 53 in a manner to place them in their On condition. Thus, after the elapse of a given delay interval measured from the time the vertical beam intercepts the selected target, the alarm means 49 is restored to normal if not already in that condition.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a ground-based V-beam radar system having jointly rotatable slant plane beam and vertical plane beam antennas, said system being adapted to provide a first signal proportional to the slant range from said antennas to a selected above-ground target and a second signal proportional to the azimuth angle through which said antennas must be rotated for their respective planes of transmission to successively intersect said target, means for supplying an output signal proportional to the height of said target corrected for earth's curvature and atmospheric refraction, said corrected height less a given fraction of said slant range squared having a predetermined linear variation with said azimuth angle for each value of said slant range, said output signal supply means comprising functional multiplier means responsive to said first and second signals for providing a third signal proportional to said corrected height less said given fraction of slant range squared, and means responsive to said first signal for increasing said third signal by an amount proportional to said given fraction of slant range squared to provide said output signal proportional to corrected height.

2. The system of claim 1 further comprising means including an indicator device for providing a visual indication according to the corrected height signal output of said system.

3. In a V-beam radar system adapted to provide an electrical azimuth angle signal and a mechanical range signal for each target detected by the system, means for supplying a signal voltage proportional to the height of said targets corrected for earth's curvature and atmospheric refraction, said corrected height less a given fraction of target range squared having a predetermined linear variation with azimuth angle for each value of range, said height signal voltage supplying means comprising a potentiometer having a pair of end terminals and a slidable contact, means connected across said end terminals for energizing said potentiometer in accordance with said electrical azimuth angle signal, means connected to said contact for sliding the same over the winding of said potentiometer in accordance with said mechanical range signal, said potentiometer being wound so that the signal voltage obtained across said slidable contact and one of said end terminals is proportional to said corrected height less said given fraction of target range squared, and means for adding a signal voltage proportional to said given fraction of target range squared to said contact signal voltage to provide a resultant voltage proportional to said corrected height.

4. In a radar system including a rotatably driven scanning apparatus coupled to transmitter and receiver means for radiating a radiation pattern having two planar components relatively disposed to form a V-beam and for receiving the echoes from each of said planar components as they successively impinge upon a target, signal generating means coupled to said receiver means and responsive to said echoes for providing a first signal proportional to the azimuth angle through which said scanning apparatus rotates from the time an echo is received from the leading one of said planar components to the time an echo is received from the trailing one of said components, gating means interposed in the coupling between said receiver means and said first signal generating means for preventing the latter from responding to echoes other than those received from targets located in a predetermined volumetric segment of space, signal generating means for providing a second signal proportional to the slant range from said scanning apparatus to a selected target in said segment of space, and computing means responsive to said first and second signals for supplying an output signal proportional to the height of said selected target providing that said first signal is proportional to the azimuth angle through which said scanning apparatus rotates between the times that said planar V-beam components successively impinge upon said selected target.

5. The system of claim 4 further including a normally unactuated alarm device, and control means coupled to said device and responsive to echoes from the trailing component of the V-beam for actuating said device in the event that the first target upon which said trailing component impinges after the leading component has impinged upon the selected target is a target other than said selected target, whereby an alarm is given when the input to the computing means is such as to provide a false height signal output.

6. The system of claim 5 wherein the control means for actuating the alarm device is responsive to echoes from the leading component of the V-beam for restoring said device to its unactuated condition if it has been actuated, and wherein the system further includes means for delaying the response of said control means to said echoes for a fixed time interval following the reception thereof, said fixed time interval being in excess of the time interval required for the components of said V-beam to successively impinge on the selected target.

7. In a radar system including a rotatably driven scanning apparatus coupled to transmitter and receiver means for radiating a radiation pattern having two planar components relatively disposed to form a V-beam and for receiving the echoes from each of said planar components as they successively impinge upon a target, signal generating means coupled to said receiver means and responsive to said echoes for providing a first signal proportional to the azimuth angle through which said scanning apparatus rotates from the time an echo is received from the leading one of said planar components to the time that an echo is received from the trailing one of said components, gating means interposed in the coupling between said receiver means and said first signal generating means for preventing the latter from responding to echoes other than those received from targets located in a predetermined volumetric segment of space, signal generating means for providing a second signal proportional to the slant range from said scanning apparatus to a selected target in said segment of space, the height of said selected target less a given fraction of its slant range squared having a predetermined linear variation for each value of said range with respect to the azimuth angle through which said scanning apparatus rotates between the times that said V-beam components successively impinge upon said selected target, means responsive to said first and second signals for supplying a third signal that varies linearly with respect to said first signal as the height of said selected target less said given fraction of its range squared is predetermined to vary with respect to the azimuth angle of said selected target for its range, and means responsive to said second signal for increasing said third signal by an amount proportional to said given fraction of range squared to provide a resultant signal, whereby said resultant signal is proportional to the height of said selected target whenever said first signal is proportional to said azimuth angle of successive beam component impingement upon said selected target.

8. Alarm apparatus for providing an alarm when the angularly-disposed planar components of the azimuthally-rotating radiation pattern of a V-beam radar system successively impinge upon different targets, said apparatus comprising a first bistable multivibrator adapted to respond to the first echo received from the trailing one of said planar components to switch from a first stable condition to its second stable condition and to respond to the second echo received therefrom to switch back to its first stable condition, a second bistable multivibrator connected to said first multivibrator, said second multivibrator being responsive to the output of said first multivibrator so as to switch from a first stable condition to its second stable condition solely when said first multivibrator switches from its second stable condition to its first, and an alarm device coupled to said second multivibrator so as to be actuated by the output of the latter only when said second multivibrator is in its second stable condition.

9. The alarm apparatus of claim 8 wherein the multivibrators are adapted to jointly respond after a fixed time delay to the first echo received by the leading one of the V-beam planar components so as to switch to their respective first stable conditions if not already there, said fixed time delay being predetermined to be in excess of the time required for said planar components to successively impinge upon the target from which said first echo is derived, whereby said apparatus may be reset for monitoring a second echo received by said leading V-beam component.

No references cited.